(12) United States Patent
Marsh et al.

(10) Patent No.: US 10,256,698 B2
(45) Date of Patent: Apr. 9, 2019

(54) FLUID GENERATOR SYSTEM

(71) Applicant: The United States of America as Represented by The Secretary of The Army, Washington, DC (US)

(72) Inventors: Charles P Marsh, Urbana, IL (US); Axy Pagan-Vazquez, Champaign, IL (US); Carl A Feickert, Champaign, IL (US); Aaron Averbuch, Champaign, IL (US); Meredith C. K. Sellers, Newark, CA (US); Christopher Joel Foster, Champaign, IL (US); Scott M. Lux, Urbana, IL (US); Justin Hesterberg, Waterloo, IL (US); Andy Friedl, Boston, MA (US); John Alexander Magerko, III, Monument, CO (US)

(73) Assignee: The United States of America as Represented by The Secretary of The Army, Washington, DC (US)

( * ) Notice: Subject to any disclaimer, the term of this patent is extended or adjusted under 35 U.S.C. 154(b) by 0 days.

(21) Appl. No.: 15/279,984

(22) Filed: Sep. 29, 2016

(65) Prior Publication Data

US 2018/0091023 A1    Mar. 29, 2018

(51) Int. Cl.
| | |
|---|---|
| H02K 7/18 | (2006.01) |
| F03G 7/08 | (2006.01) |
| H02K 35/04 | (2006.01) |
| F03B 13/10 | (2006.01) |
| F03B 17/06 | (2006.01) |

(52) U.S. Cl.
CPC ............ H02K 7/1876 (2013.01); F03B 13/10 (2013.01); F03B 17/06 (2013.01); F03G 7/08 (2013.01); H02K 35/04 (2013.01)

(58) Field of Classification Search
CPC ........ H02K 7/1876; H02K 35/04; F03G 7/08; F03B 13/10; F03B 17/06
See application file for complete search history.

(56) References Cited

U.S. PATENT DOCUMENTS

| | | | | |
|---|---|---|---|---|
| 7,626,281 | B2 * | 12/2009 | Kawai ........................ | F03D 5/06 290/1 R |
| 8,272,839 | B2 * | 9/2012 | Gartner .................... | F03B 17/00 416/132 A |
| 2008/0129254 | A1 * | 6/2008 | Frayne ..................... | F03B 17/06 322/3 |
| 2008/0295509 | A1 * | 12/2008 | Bernitsas ................. | F03B 17/06 60/497 |
| 2008/0297119 | A1 * | 12/2008 | Frayne ..................... | F03B 5/00 322/3 |

(Continued)

*Primary Examiner* — Pedro J Cuevas
*Assistant Examiner* — Sean Gugger
(74) *Attorney, Agent, or Firm* — Brian C. Jones

(57) ABSTRACT

The present invention is a fluid power generator with elastic tension gradient strips that move in a serpentine fashion to generate power from fluid flow. Each strip has a tension gradient that decreases going back. This allows steady serpentine movement of the strip to move a coil generator across multiple magnets to generate power. Tensioning tubes keep the strips under tension and attach the strips to a strip support that also supports a magnet holder. The magnet holder keeps the magnets in position within the coil generators so that any serpentine movement of the strip can generate power.

20 Claims, 6 Drawing Sheets

(56) References Cited

U.S. PATENT DOCUMENTS

| | | | |
|---|---|---|---|
| 2010/0078941 A1* | 4/2010 | Filardo | F03B 13/188 290/52 |
| 2013/0020806 A1* | 1/2013 | Hsu | F03G 7/08 290/54 |
| 2013/0214532 A1* | 8/2013 | Hsu | F03G 7/08 290/43 |
| 2014/0097621 A1* | 4/2014 | Kassianoff | B63H 1/36 290/55 |

* cited by examiner

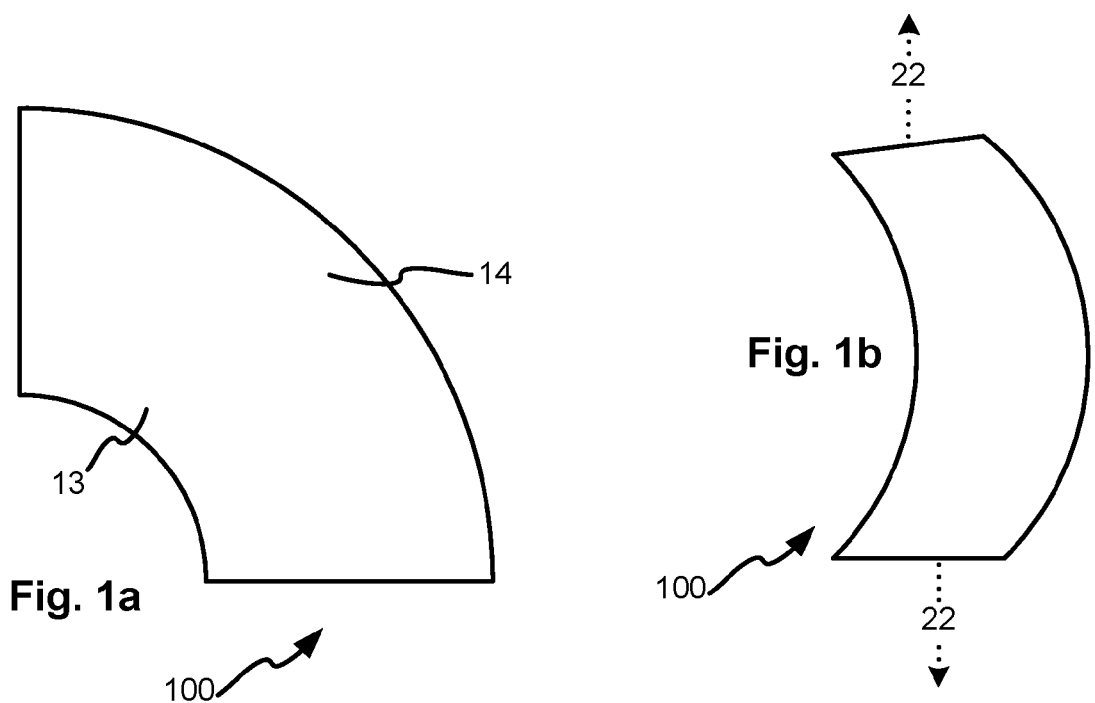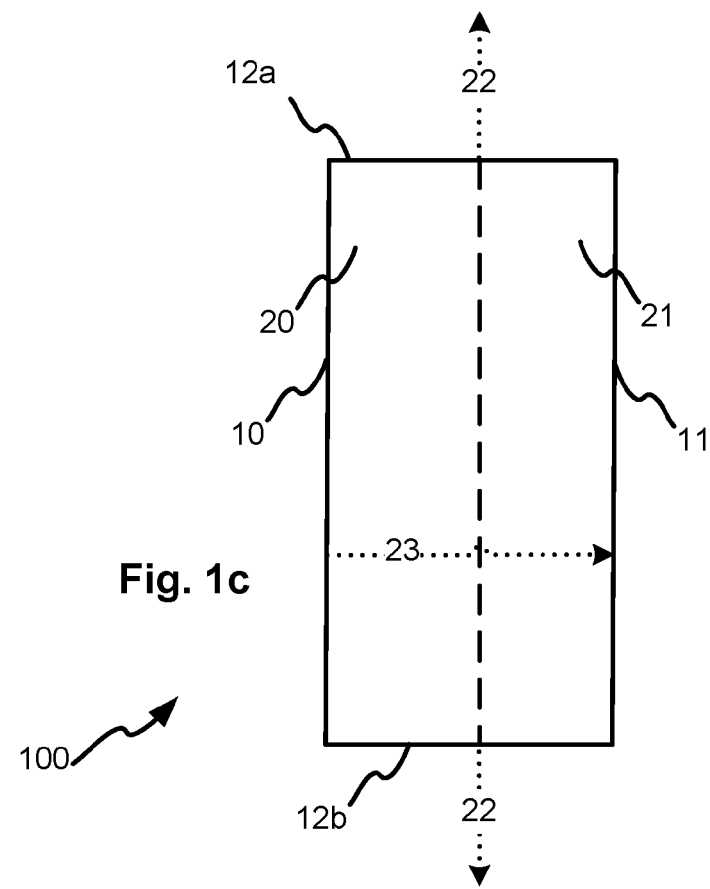

US 10,256,698 B2

FLUID GENERATOR SYSTEM

STATEMENT REGARDING FEDERALLY SPONSORED RESEARCH OR DEVELOPMENT

The invention described herein was made by employees of the United States Government and may be manufactured and used by the Government of the United States of America for governmental purposes without the payment of any royalties thereon or therefore.

BACKGROUND OF THE INVENTION

1. Field of Invention

This invention relates to the field of fluid reaction surfaces and more specifically to a flexible working member for oscillatory reaction motion.

2. Description of Related Art

Conventional wind and other fluid turbines use the rotation of rigid blades mounted to a hub to convert kinetic wind energy into electrical power. Each turbine has minimum and maximum wind speeds for power generation. Increased wind speed increases power generation. However, the minimum wind speeds required by wind turbines prevent them from effectively harnessing light winds for power generation. Conventional wind turbines require tall, heavily reinforced support towers, limiting the areas in which they may be deployed. The rapidly rotating blades also present a physical danger to wildlife and maintenance personnel during operation. Moreover, these turbines may cause interference with radar and other sensors, as well as increase noise pollution in the surrounding area.

Previous wind turbines have attempted to decrease the minimum wind speeds required for wind turbine activation by reducing blade weight and corresponding start-up inertia, as well as reducing friction between the hub and rotational bearings. Unfortunately, the reduced-weight blades may not possess sufficient strength to withstand continuous use or use in heavy winds. Friction reduction typically requires repeated maintenance. Shrouding or screening the turbine blades to protect wildlife and maintenance personnel reduces the amount of kinetic energy available for power generation. Some fluid turbine systems use oscillating instead of rotating blades, but these face the same structural and safety issues.

There is an unmet need in the art for a fluid-based power generation system that does not rely on a rotating rigid blade structure.

There is a further unmet need in the art for a fluid-based power generation system that provides a lightweight system with increased safety measures.

BRIEF SUMMARY OF THE INVENTION

One embodiment of this invention is an elastic tension gradient (ETG) strip with a generation coil. The generation coil is a hollow-core coil of a coated metallic wire located between leading and back edges of the ETG. A tension gradient extends from the leading edge to the back edge when the ETG strip is in a fully tensioned configuration. The tension gradient decreases tension in the ETG strip from the leading edge to the back edge by a percentage ranging from approximately 1% to approximately 100%.

In another embodiment, the ETG strips are utilized in a novel fluid power generator which includes tensioning tubes attached to the ETG strips by upper and lower strip support components. Magnets secured into place in a position parallel to the strip support components by means of a magnet holder which extends through the generation coil of the ETG strips.

Another embodiment of the invention further includes a conditioning circuit having power conversion components and input and output filters.

BRIEF DESCRIPTION OF SEVERAL VIEWS OF THE DRAWING(S)

FIGS. 1a-1c illustrate side views of an exemplary embodiment of an elastic tension gradient (ETG) strip in slack, partially tensioned and fully tensioned states, respectively.

DETAILED DESCRIPTION OF THE INVENTION

Figure 2:
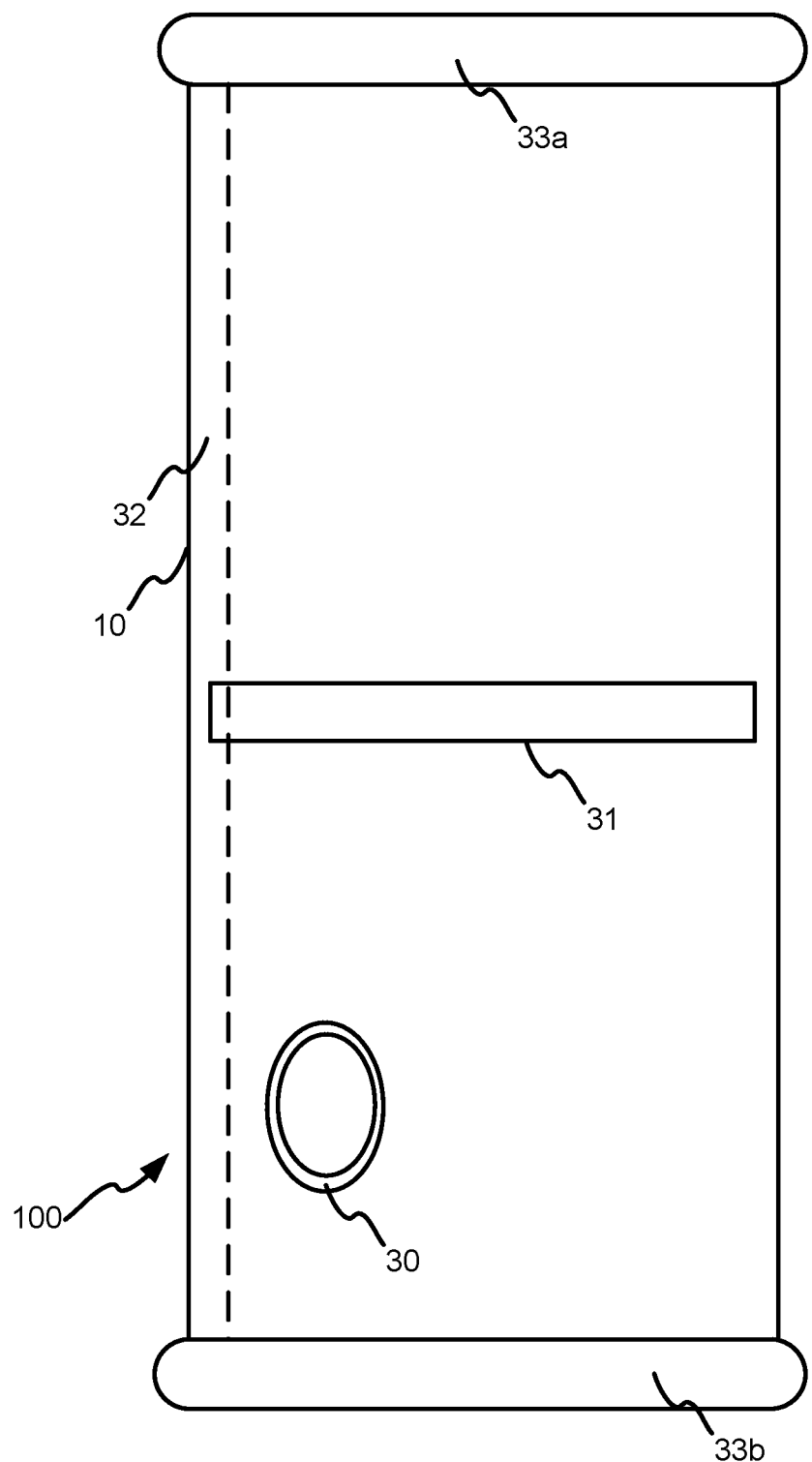
FIG. 2 illustrates a side view of an exemplary embodiment of a mounted ETG strip.

FIGS. 1a-1c illustrate side views of an exemplary embodiment of an ETG strip 100 in slack, partially tensioned and fully tensioned states, respectively. ETG strip 100 includes leading edge 10, back edge 11, attachment edges 12a and 12b, front section 20 and back section 21.

In the exemplary embodiment, ETG strip 100 has a lunate configuration when slack, as illustrated in FIG. 1a. Alternate embodiments of ETG strip 100 may have a crescent, trapezoidal, rectangular, hemispherical or circular segment configuration when slack. In the exemplary embodiment, ETG strip 100 is a flexible, elastic material, such as, but not limited to, natural latex, synthetic latex, polychloroprene or combinations thereof. Elastic materials are able to resume their normal shape spontaneously after deformation. In the exemplary embodiment, when fully tensioned ETG strip 100 has a length ranging from approximately 50 cm to approximately 90 cm, a thickness ranging from approximately 1/64 inch to approximately 1/16 inch and a width ranging from approximately 4 cm to approximately 12 cm. In certain embodiments, one or more of these dimensions may vary. In one embodiment, the thickness of ETG strip 100 decreases moving along the width from leading edge 10 to back edge 11.

In the exemplary embodiment of FIGS. 1a-1c, front section 20 and back section 21 are sections of a single piece. In other embodiments, front section 20 and back section 21 are separate pieces connected by stitching or at least one hinge. In the slack state shown in FIG. 1a, leading edge 10 has a leading edge segment 13 and back edge 11 has a back edge segment 14. In the slack state shown in the exemplary embodiment of FIG. 1a, leading edge 10 and back edge 11 are parallel to each other.

In the exemplary embodiment, leading edge segment 13 is identical to back edge segment 14. When ETG strip 100 is partially tensioned under the influence of linear forces 22 as shown in FIG. 1b, the curvature results in front section 20 being under tension while back section 21 remains slack. When ETG strip 100 is fully tensioned as shown in FIG. 1c, this size difference results in a tension gradient 23 between front section 20 and back section 21. The tension gradient 23 shown in FIG. 1c may decrease the tension from leading edge 10 to back edge 11 by a percentage ranging from approximately 1% to approximately 100%. The term "tension" refers to a stress normal to a cross-sectional area of a segment of material.

Fluid flowing over ETG strip 100 from leading edge 10 to back edge 11 causes ETG strip 100 to move in a serpentine motion due to tension gradient 23. Serpentine motion is a combination of oscillatory and torsional motion. As front section 20 is perturbed by oncoming fluid flow, fluid pressure is applied unevenly to the sides of ETG strip 100, pushing ETG strip 100 in the direction of lower pressure. Due to the greater tension in front section 20, leading edge 10 of the ETG strip 100 starts to return to the neutral position while back edge 11 of ETG strip 100 continues away from the neutral position due to the momentum of ETG strip 100. At this point, ETG strip 100 has rotated in the fluid flow such that pressure is now higher on the opposite side of ETG strip 100 and the cycle repeats in the opposite direction.

FIG. 2 illustrates a side view of an exemplary embodiment of a mounted ETG strip 100. The exemplary embodiment of FIG. 2 illustrates additional structures of ETG strip 100, including at least one generation coil 30, an optional stiffening bar 31, an optional leading edge reinforcement 32 and tensioning tubes 33a and 33b.

Generation coil 30 is a hollow-core coil of coated metallic wire, such as, but not limited to, aluminum, copper or combinations thereof. Coils are elements wound in a continuous looped configuration. The wire gauge ranges from approximately 24 AWG to approximately 40 AWG. Certain embodiments of generation coil 30 may include multiple wire gauges. The number of loops ranges from approximately 20 to approximately 5,000. Certain embodiments of generation coil 30 may include multiple separate generation coils 30, which may have different wire gauges and/or numbers of loops between them.

In the exemplary embodiment, generation coil 30 is configured as an ellipse with the long axis extending vertically and the short axis extending horizontally. An ellipse is a rounded oval shape having a long axis and a short axis perpendicular to each other. In other embodiments, generation coil 30 is circular. When ETG strip 100 is fully tensioned, generation coil 30 is located in an aperture in ETG strip 100 between leading edge 10 and back edge 11. In certain embodiments, generation coil 30 has rollers, bearings or other means for reducing friction within the hollow-core to reduce friction and guide the motion of generation coil 30. In certain embodiments, generation coil 30 has an aerodynamic cover to reduce drag. In certain embodiments, generation coil 30 has conductive contacts to transmit the generated power to a stationary conductor.

Stiffening bar 31 is a substantially rigid horizontal bar located at a length midpoint of ETG strip 100, extending from a first point proximal to leading edge 10 to a second point proximal to back edge 11. Optional stiffening bar 31 enhances the generation of serpentine motion by providing an increased surface area for the fluid without hindering the serpentine motion.

Leading edge reinforcement 32 increases the thickness of ETG strip 100 along leading edge 10. In one embodiment, leading edge reinforcement 32 is leading edge 10 folded over and attached to itself using adhesive, stitches or any other means known in the art. In another embodiment, leading edge reinforcement 32 is a separate structure attached to leading edge 10 using adhesive, stitches or any other means known in the art.

In the exemplary embodiment, tensioning tubes 33a and 33b are slotted tubes through which attachment edges 12a and 12b of ETG strip 100 pass. Rotating tensioning tubes 33a and 33b allows adjustment of tension in ETG strip 100 while maintaining a uniform force along attachment edges 12a and 12b. In the exemplary embodiment, tensioning tubes 33a and 33b are polymer tubes. In other embodiments, attachment edges 12a and 12b connect to tensioning tubes 33a and 33b by means of a dowel, a spring clip or at least one loop formed along or from attachment edges 12a and 12b.

Figures 3A, 3B:
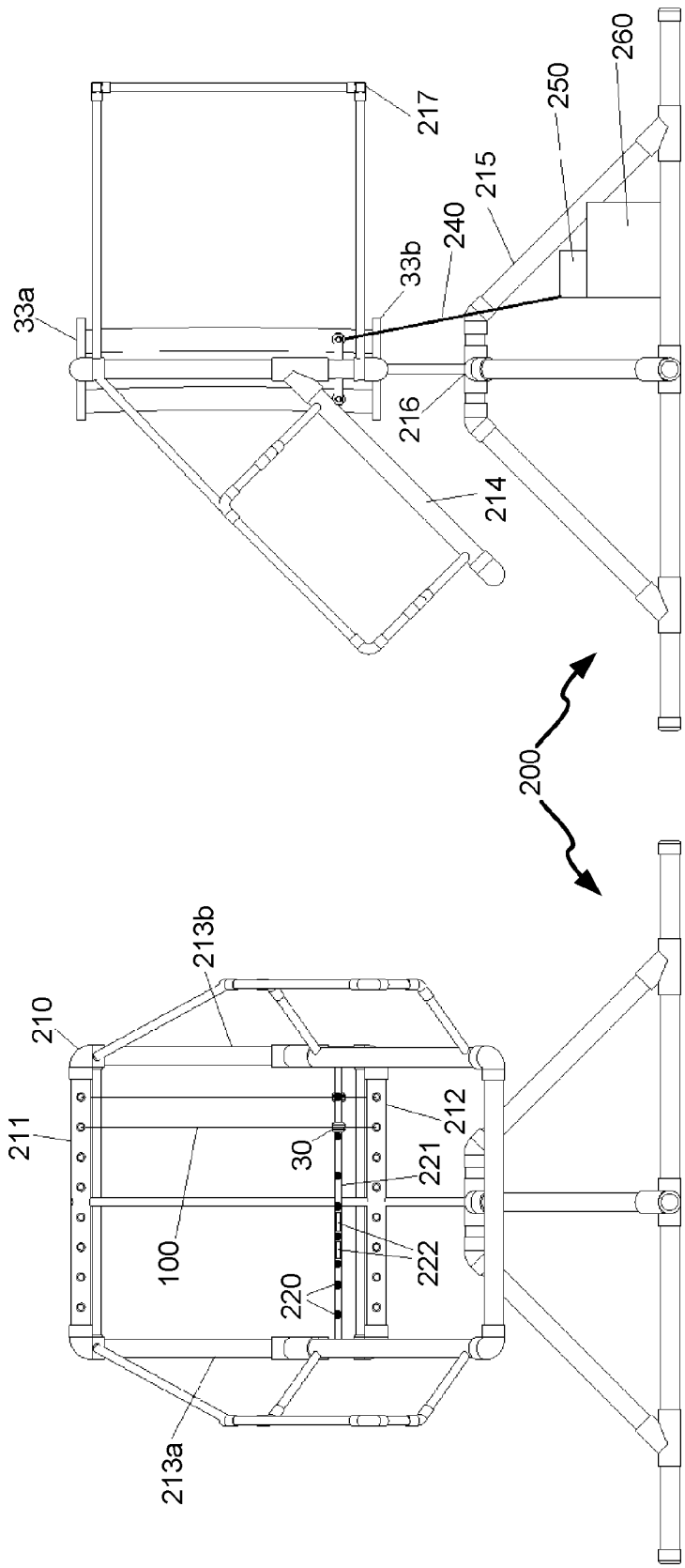
FIGS. 3a and 3b illustrate front and side views of an exemplary embodiment of a fluid generator, while FIG. 3c provides detailed views of another embodiment of the fluid generator and FIG. 3d provides a diagram of an exemplary embodiment of a conditioning circuit.
Figure 3C:
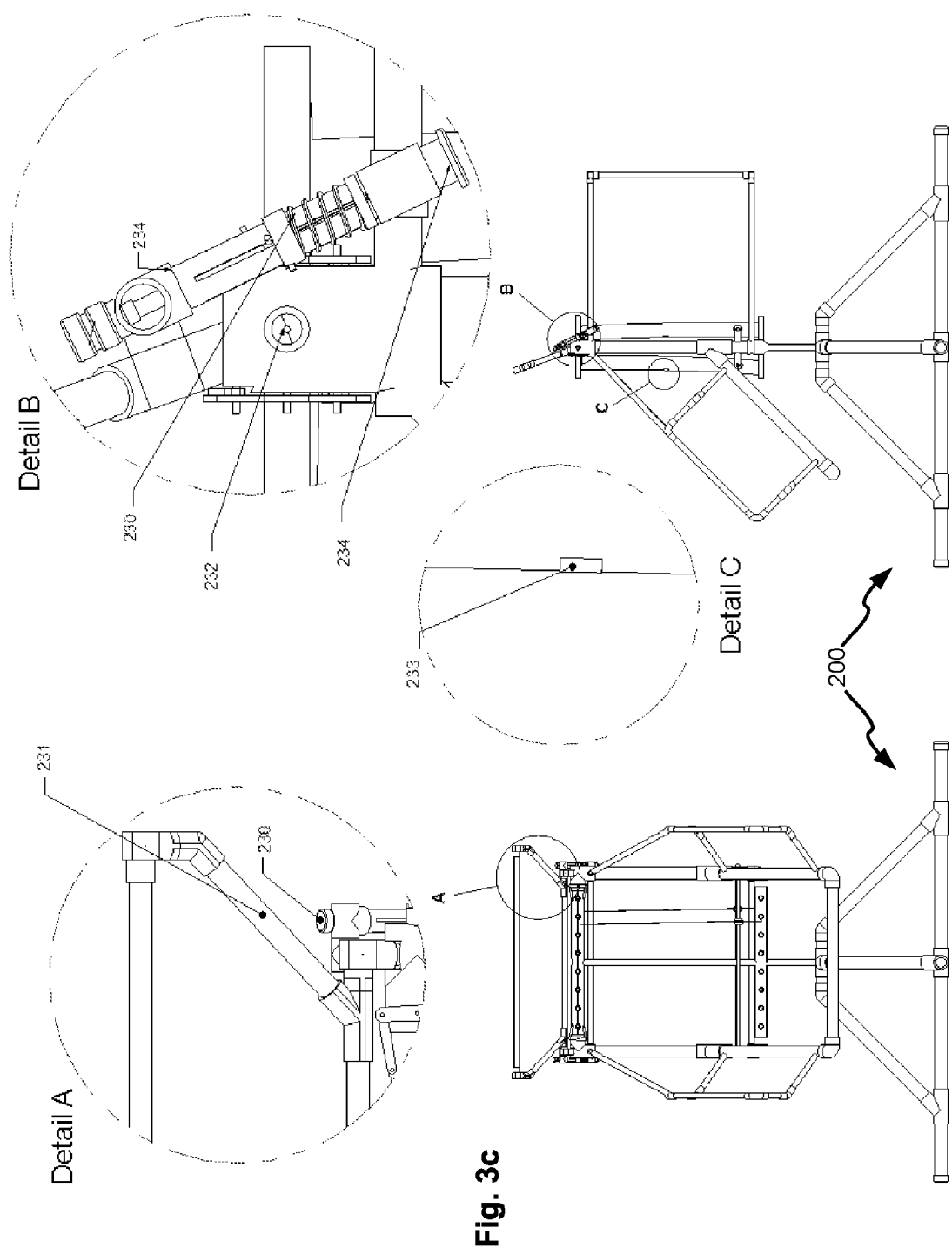
Figure 3D:
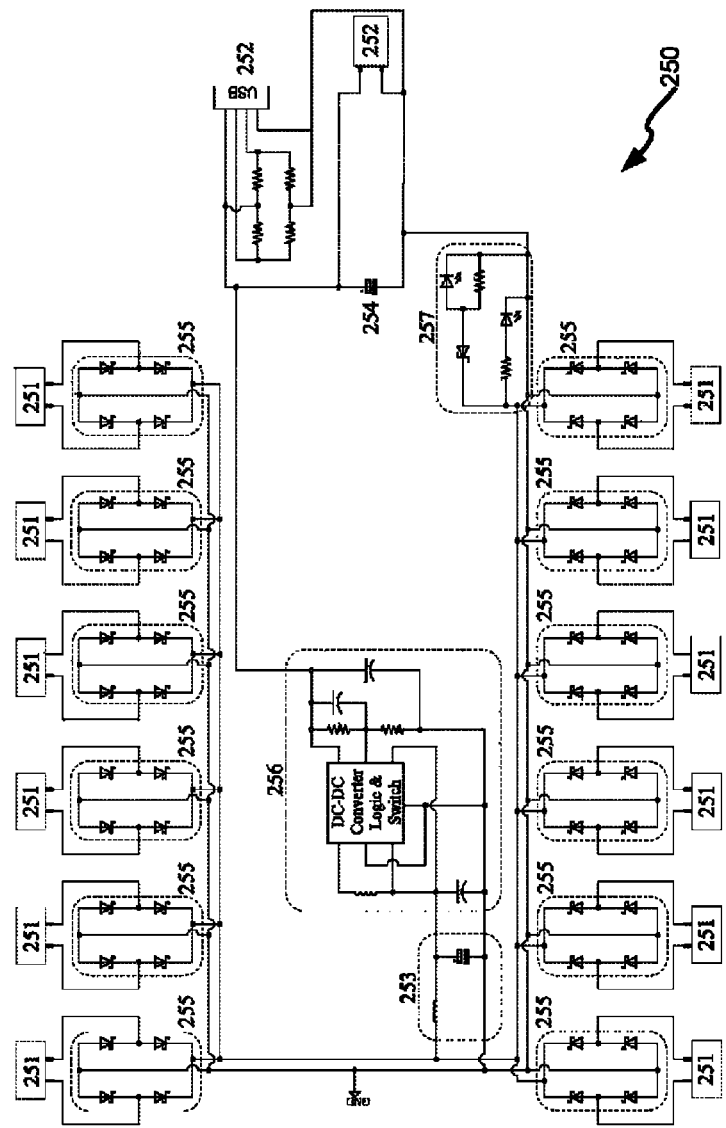

FIGS. 3a and 3b illustrate front and side views of an exemplary embodiment of fluid generator 200. FIG. 3c provides detailed views of another embodiment of fluid generator 200. FIG. 3d provides a diagram of an exemplary embodiment of conditioning circuit 250. Fluid generator 200 includes at least one ETG strip 100, a strip support 210, at least one magnet 220, an optional spring tensioner 230, at least one power connection 240, at least one conditioning circuit 250 and a power transmission circuit 260. While the exemplary embodiment of FIG. 3a illustrates five ETG strips 100 arranged in a single row, other embodiments may include between approximately five and approximately 20 ETG strips 100, arranged in one to three parallel rows. In embodiments with multiple rows, ETG strips 100 are staggered so that no ETG strip 100 is located directly in front of another ETG strip 100.

Strip support 210 includes a rigid upper support 211 and at least one lower support 212 separated by a length L. Each ETG strip 100 is arranged such that generation coil 30 is located approximately 20% to approximately 25% of length L from upper support 211 or lower support 212. Tensioning tubes 33a and 33b are operably attached to upper support 211 and lower support 212, respectively. In certain embodiments, lower support 212 can be a weight attached to tensioning tube 33b, rather than the rigid support shown in FIGS. 3a and 3b. Strip support 210 also includes upright supports 213a and 213b, which connect upper support 211 and lower support 212 and ensure that each ETG strip 100 remains tensioned. Certain embodiments of fluid generator 200 also include at least one guide plane 214 operably connected to strip support 210. Guide plane 214 is a planar component that can orient fluid generator 200 or guide fluid into ETG strips 100 to increase output. Guide planes 214 can be located in the front, back or side of strip support 210 and may be angled to "funnel" fluid into ETG strips 100.

In certain embodiments, strip support 210 includes at least one support leg 215, which connects to upper support 211 or lower support 212 by a support joint 216. Support joint 216 allows rotation in up to three degrees of motion, permitting strip support 210 to move to accommodate shifts in fluid direction. An optional counterweight 217 keeps strip support 210 in a consistently vertical orientation.

In embodiments with multiple magnets 220, magnets 220 have a face-to-face orientation of either N-N or S-S to optimize the magnetic flux and increase power generation. In the exemplary embodiment, magnets 220 are nickel-coated neodymium. Other embodiments use other rare earth magnets, other permanent magnets or a magnetic field generator. In certain embodiments, a gap of up to approximately 2 cm separates magnets 220. In certain embodiments, the faces of magnets 220 are not located parallel to each other to concentrate the magnetic flux into a smaller, directed area.

Magnetic holder 221 is a non-magnetic tube that holds at least one magnet 220 in place between at least one of upper support 211 and lower support 212. Magnetic holder 221 also extends through at least one generation coil 30. In the exemplary embodiment, magnetic holder 221 is a flexible clear polymer. The outer diameter of magnetic holder 221 is smaller than the short axis of the hollow core of generation coil 30 to enable generation coil 30 to move along magnetic holder 221. Magnet spacers 222 are sections of non-magnetic material ensuring that the spacing of magnets 220 in magnetic holder 221 remains constant.

As shown in FIG. 3c, certain embodiments of fluid generator 200 also include at least one angled guide plane 214 mounted to moment arm 231 pivoting about pivot 232 to self-adjust either upper support 211 or lower support 212, producing tension in ETG strips 100 based upon the speed for fluid flow. Spring tensioner 230 is attached to either upper support 211 or lower support 212. Spring tensioner 230 includes angled guide plane 214. As fluid force increases on guide plane 214, guide plane 214 pivots about pivot 232 against biasing element 233. This motion increases tension on each ETG strip 100 by means of a moment arm 241 operably connected to either upper support 211 or lower support 212. As fluid force decreases, biasing element 233 pivots spring tensioner 230 in the opposite direction to decrease tension on each ETG strip 100. A pivot stop 234 prevents over-tensioning of each ETG strip 100 by limiting the rotation fluid force can cause.

Each generation coil 30 connects to conditioning circuit 250 by means of a power connection 240, which transmits current generated by generation coil 30 to conditioning circuit 250. Conditioning circuit 250 includes at least one input 251, at least one output 252, input filter 253, output filter 254, rectifier 255, power converter 256 and an optional overvoltage protection circuit 257. Power connection 240 transmits current generated by each generation coil 30 to a separate input 251. Each input 251 has an input filter 253, which may be an inductive and/or capacitive filter. Optionally, each input 251 also has a rectifier 255. Rectifier 255 may be a full bridge, half bridge or voltage-multiplying rectifier. In the exemplary embodiment, rectifiers 255 are Schottky diode rectifiers. In alternate embodiments, rectifiers 255 are silicone diode rectifiers or germanium diode rectifiers.

Current passes from each input 251 to power converter 256, which increases or decreases the signal voltage. Power converter 256 may be a single-ended primary inductor converter, a linear regulator, a buck converter, a buck-boost converter, an ultralow-voltage boost converter or a low-voltage boost converter. The current then passes to output filter 254, which may be an inductive and/or capacitive filter, and then to output 252. Optionally, conditioning circuit 250 includes overvoltage protection circuit 257 between input 251 and power converter 256, which prevents damage to elements of conditioning circuit 250 when voltage in conditioning circuit 250 rises to a level ranging from approximately 20% below to 5% above the maximum voltage of power converter 256. In the exemplary embodiment, overvoltage protection circuit 257 includes a diode, an optional resistor and an optional LED.

Power transmission circuit 260 transmits current from at least one output 252. Power transmission circuit 260 may directly supply power to a system or device, or may be a power storage unit such as a battery.

Figure 4:
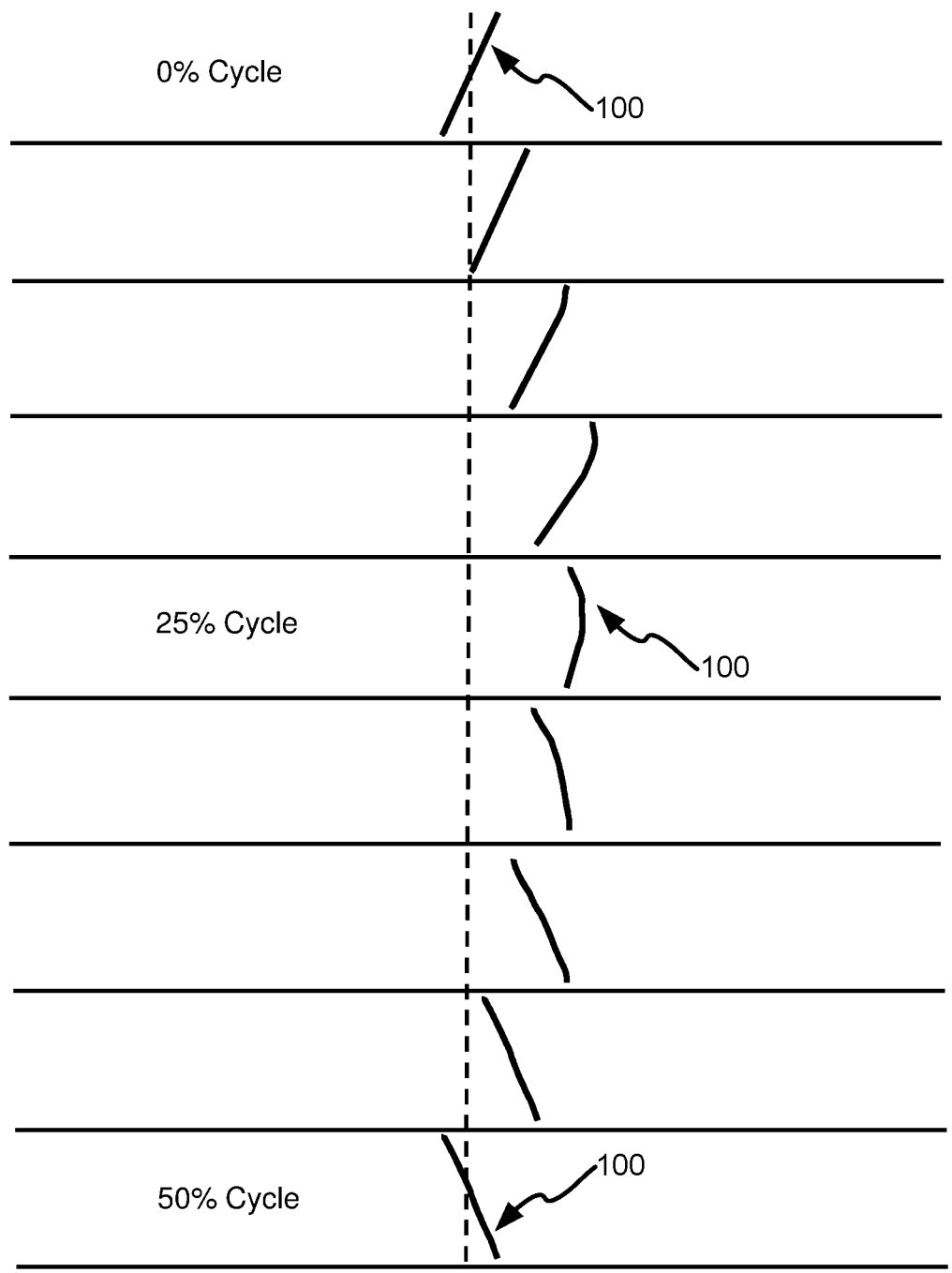
FIG. 4 illustrates cross-sectional views of an exemplary embodiment of an ETG strip over a half-cycle of serpentine motion.

FIG. 4 illustrates cross-sectional views of an exemplary embodiment of ETG strip 100 over a half-cycle of serpentine motion.

It will be understood that many additional changes in the details, materials, procedures and arrangement of parts, which have been herein described and illustrated to explain the nature of the invention, may be made by those skilled in the art within the principle and scope of the invention as expressed in the appended claims. Moreover, the terms "substantially" or "approximately" as used herein may be applied to modify any quantitative representation that could permissibly vary without resulting in a change in the basic function to which it is related. As used herein, the term "at least one" means one or more. As used herein, the term "plurality" means more than one.

It should be further understood that the drawings are not necessarily to scale; instead, emphasis has been placed upon illustrating the principles of the invention. For clarity, duplicate elements between drawings may not be shown or labelled in all drawings.

What is claimed is:

1. An elastic tension gradient (ETG) strip apparatus, comprising:
    a leading edge having a leading edge radius and a back edge having a back edge radius,
    wherein said back edge radius is greater than said leading edge radius when said ETG strip is in a slack configuration,
    wherein said leading edge is positioned in relation to said back edge to form a tension gradient when said ETG strip is in a fully tensioned configuration,
    wherein said tension gradient decreases tension in said ETG strip as measured from said leading edge to said back edge by a percentage ranging from approximately 1% to approximately 100%;
    a plurality of attachment edges; and
    at least one generation coil located in an aperture between said leading edge and said back edge, wherein said at least one generation coil is at least one hollow-core coil of a coated metallic wire.

2. The apparatus of claim 1, wherein said apparatus has a lunate configuration characterized by two parallel curved edges extending between two straight edges.

3. The apparatus of claim 1, wherein said generation coil is configured as an ellipse with a long axis extending vertically and a short axis extending horizontally.

4. The apparatus of claim 1, wherein said hollow-core coil comprises a plurality of loops numbering from approximately 20 to approximately 5,000.

5. The apparatus of claim 1, wherein said apparatus further includes a substantially rigid bar located between said plurality of attachment edges and extending between a first point proximal to said leading edge and a second point proximal to said back edge.

6. The apparatus of claim 1, wherein said leading edge is thicker than said back edge.

7. A fluid power generator system, comprising:
    a plurality of ETG strips, wherein each of said plurality of ETG strips comprises:
        a leading edge having a leading edge radius and a back edge having a back edge radius,
        wherein said back edge radius is greater than said leading edge radius when said ETG strip is in a slack configuration,
        wherein said leading edge is positioned in relation to said back edge to form a tension gradient when said ETG strip is in a fully tensioned configuration, wherein said tension gradient decreases tension in said ETG strip as measured from said leading edge to said back edge by a percentage ranging from approximately 1% to approximately 100%,
a plurality of attachment edges, and
at least one generation coil located in an aperture between said leading edge and said back edge, wherein said at least one generation coil is at least one hollow-core coil of a coated metallic wire;
a plurality of tensioning tubes, wherein each of said plurality of tensioning tubes is attached to one of said plurality of attachment edges;
a strip support comprising an upper support and a lower support separated by a length L, wherein each of said upper support and said lower support is operably coupled to one-half of the number of said plurality of tensioning tubes; and
at least one magnetic holder holding at least one magnet in place parallel to at least one of said upper support and said lower support, wherein said at least one magnetic holder extends through said at least one generation coil.

8. The system of claim 7, wherein each generation coil is located approximately 20% to approximately 25% of said length L from one of said upper support or said lower support.

9. The system of claim 7, wherein said plurality of ETG strips number between five and approximately 20, wherein said plurality of ETG strips are arranged in parallel rows numbering between one and three.

10. The system of claim 7, wherein said at least one magnet is selected from the group consisting of a nickel-coated neodymium magnet, a rare earth magnet, a permanent magnet and a magnetic field generator.

11. The system of claim 7, wherein said at least one magnet comprises a plurality of magnets.

12. The system of claim 11, wherein said plurality of magnets are arranged in a face-to-face orientation selected from the group consisting of: N-N and S-S.

13. The system of claim 11, wherein said plurality of magnets are arranged in a non-parallel face-to-face orientation.

14. The system of claim 7, further comprising at least one guide plane located in the front, back or side of said strip support.

15. The system of claim 7, further comprising at least one spring tensioner operably connected to one of said upper support or said lower support, said spring tensioner comprising an angled guide plane rotatably connected to a moment arm at a pivot, wherein said moment arm is operably connected to one of said upper support or said lower support, wherein said angled guide plane is biased to a resting position by a biasing element.

16. A fluid power generator system, comprising:
a plurality of ETG strips, wherein each of said plurality of ETG strips comprises:
a leading edge having a leading edge radius and a back edge having a back edge radius,
wherein said back edge radius is greater than said leading edge radius when said ETG strip is in a slack configuration,
wherein said leading edge is positioned in relation to said back edge to form a tension gradient when said ETG strip is in a fully tensioned configuration,
wherein said tension gradient decreases tension in said ETG strip as measured from said leading edge to said back edge by a percentage ranging from approximately 1% to approximately 100%,
a plurality of attachment edges, and
at least one generation coil located in an aperture between said leading edge and said back edge, wherein said at least one generation coil is at least one hollow-core coil of a coated metallic wire;
a plurality of tensioning tubes, wherein each of said plurality of tensioning tubes is attached to one of said plurality of attachment edges;
a strip support comprising an upper support and a lower support, wherein each of said upper support and said lower support is operably coupled to one-half of plurality of tensioning tubes;
at least one magnetic holder holding at least one magnet in place parallel to at least one of said upper support and said lower support, wherein said at least one magnetic holder extends through said at least one generation coil; and
a conditioning circuit comprising:
at least one input having an input filter, wherein said input is operably coupled to a rectifier;
at least one power converter; and
at least one output having an output filter.

17. The system of claim 16, wherein said input filter and said output filter are selected from the group consisting of inductive filters, capacitive filters and any combination thereof.

18. The system of claim 16, wherein said rectifier is selected from the group consisting of full bridge rectifiers, half bridge rectifiers, voltage-multiplying rectifiers or any combination thereof.

19. The system of claim 16, wherein said power converter is selected from the group consisting of single-ended primary inductor converters, linear regulators, buck converters, buck-boost converters, ultralow-voltage boost converters and low-voltage boost converters.

20. The system of claim 16, further comprising at least one overvoltage protection circuit between said at least one input and said power at least one converter.

* * * * *